United States Patent
Doi et al.

(10) Patent No.: US 10,725,734 B2
(45) Date of Patent: Jul. 28, 2020

(54) VOICE INPUT APPARATUS

(71) Applicant: Sony Corporation, Minato-ku (JP)

(72) Inventors: Shouichi Doi, Kanagawa (JP); Yoshiki Takeoka, Tokyo (JP); Masayuki Takada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/049,228

(22) Filed: Jul. 30, 2018

(65) Prior Publication Data

US 2019/0012140 A1    Jan. 10, 2019

Related U.S. Application Data

(63) Continuation of application No. 14/273,735, filed on May 9, 2014, now abandoned.

(30) Foreign Application Priority Data

Jul. 10, 2013  (JP) ................................. 2013-144449

(51) Int. Cl.
  *G06F 3/0484* (2013.01)
  *G06F 3/16* (2006.01)

(52) U.S. Cl.
  CPC .......... *G06F 3/167* (2013.01); *G06F 3/04847* (2013.01)

(58) Field of Classification Search
  CPC .............................. G06F 3/167; G06F 3/04847
  See application file for complete search history.

(56) References Cited

U.S. PATENT DOCUMENTS

| | | | | | |
|---|---|---|---|---|---|
| 4,989,253 | A | * | 1/1991 | Liang | G02B 21/0012 128/897 |
| 6,154,723 | A | * | 11/2000 | Cox | G06F 3/011 345/419 |
| 6,224,542 | B1 | * | 5/2001 | Chang | A61B 1/00039 600/109 |
| 6,278,975 | B1 | * | 8/2001 | Brant | A61B 17/00 704/275 |
| 6,428,449 | B1 | * | 8/2002 | Apseloff | A63B 24/00 482/3 |
| 6,514,201 | B1 | * | 2/2003 | Greenberg | G06N 3/063 600/437 |
| 6,847,336 | B1 | * | 1/2005 | Lemelson | A61B 1/00048 345/8 |
| 7,307,647 | B2 | * | 12/2007 | Hatori | G06F 3/0481 345/472.2 |
| 7,426,467 | B2 | * | 9/2008 | Nashida | H04L 12/2805 704/275 |
| 7,468,742 | B2 | * | 12/2008 | Ahn | G06F 3/017 345/156 |
| 8,060,227 | B2 | * | 11/2011 | Stefik | G06Q 30/02 700/94 |

(Continued)

*Primary Examiner* — Phenuel S Salomon
(74) *Attorney, Agent, or Firm* — Xsensus LLP

(57) ABSTRACT

There is provided a voice input device including a processor configured to realize an address term definition function of defining an address term for at least a partial region of an image to be displayed on a display, a display control function of displaying the image on the display and temporarily displaying the address term on the display in association with the region, a voice input acquisition function of acquiring a voice input for the image, and a command issuing function of issuing a command relevant to the region when the address term is included in the voice input.

17 Claims, 13 Drawing Sheets

(56) References Cited

U.S. PATENT DOCUMENTS

| | | | | |
|---|---|---|---|---|
| 8,155,479 B2* | 4/2012 | Hoffman | ............ | A61B 1/00039 |
| | | | | 382/276 |
| 8,928,579 B2* | 1/2015 | Wilson | .................... | G06F 3/011 |
| | | | | 345/156 |
| 9,020,825 B1* | 4/2015 | Garber | .................... | G06F 3/167 |
| | | | | 704/231 |
| 2007/0200912 A1* | 8/2007 | Hung | ...................... | G10L 15/24 |
| | | | | 348/14.01 |
| 2008/0036869 A1* | 2/2008 | Gustafsson | ........ | H04N 5/23203 |
| | | | | 348/222.1 |
| 2009/0262001 A1* | 10/2009 | Haga | ...................... | G08C 17/02 |
| | | | | 341/176 |
| 2010/0275122 A1* | 10/2010 | Buxton | ................ | G06F 1/1626 |
| | | | | 715/728 |
| 2012/0110456 A1* | 5/2012 | Larco | ...................... | G06F 3/167 |
| | | | | 715/728 |
| 2012/0236025 A1* | 9/2012 | Jacobsen | ................ | G06F 3/011 |
| | | | | 345/629 |
| 2013/0033643 A1* | 2/2013 | Kim | ........................ | G06F 3/017 |
| | | | | 348/563 |
| 2014/0111427 A1* | 4/2014 | Lindley | .............. | G02B 27/0093 |
| | | | | 345/156 |
| 2014/0344627 A1* | 11/2014 | Schaub | .................. | G06F 11/26 |
| | | | | 714/46 |
| 2015/0121466 A1* | 4/2015 | Brands | ................ | H04L 65/403 |
| | | | | 726/4 |
| 2015/0173846 A1* | 6/2015 | Schneider | .......... | A61B 1/00009 |
| | | | | 600/424 |

* cited by examiner

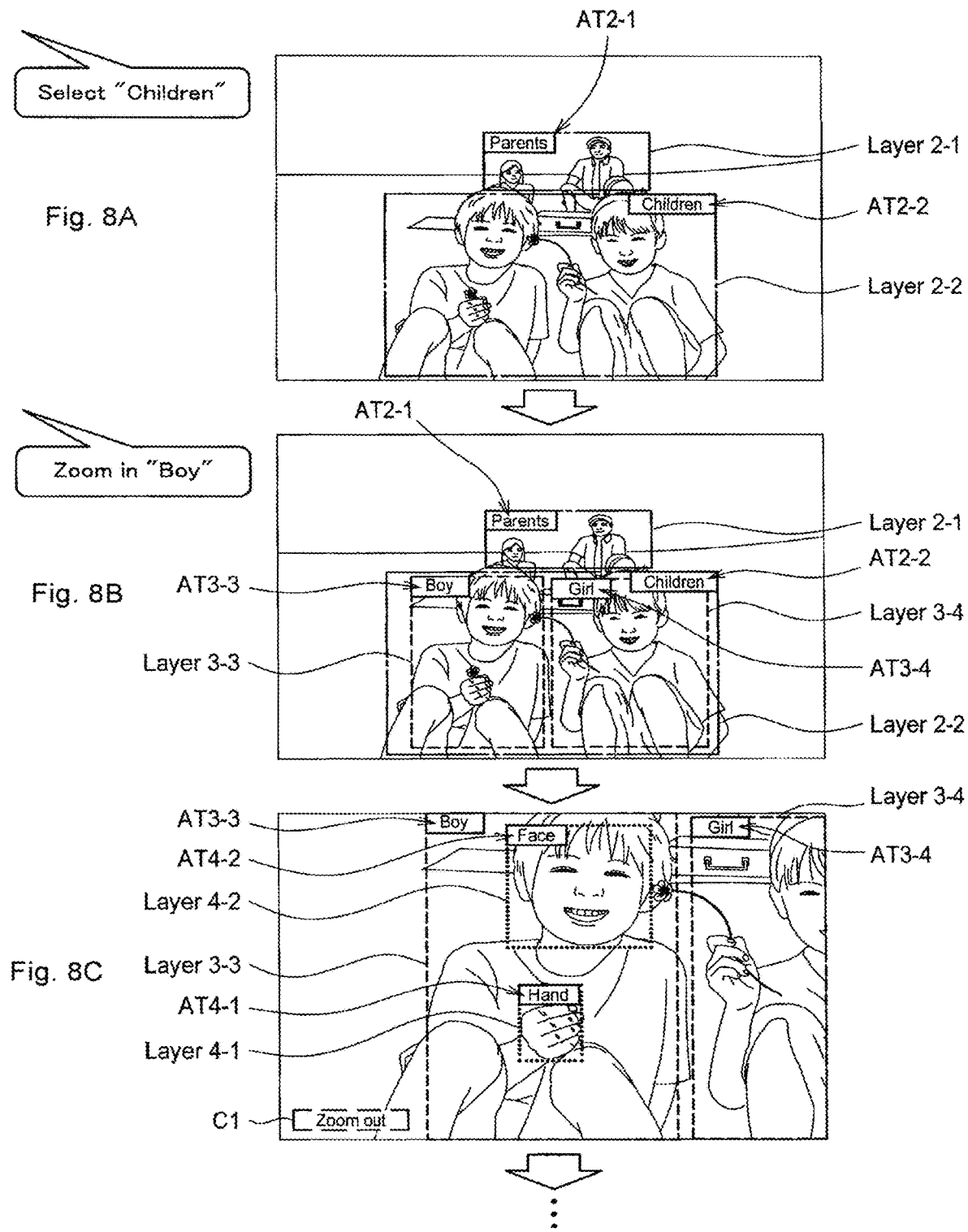

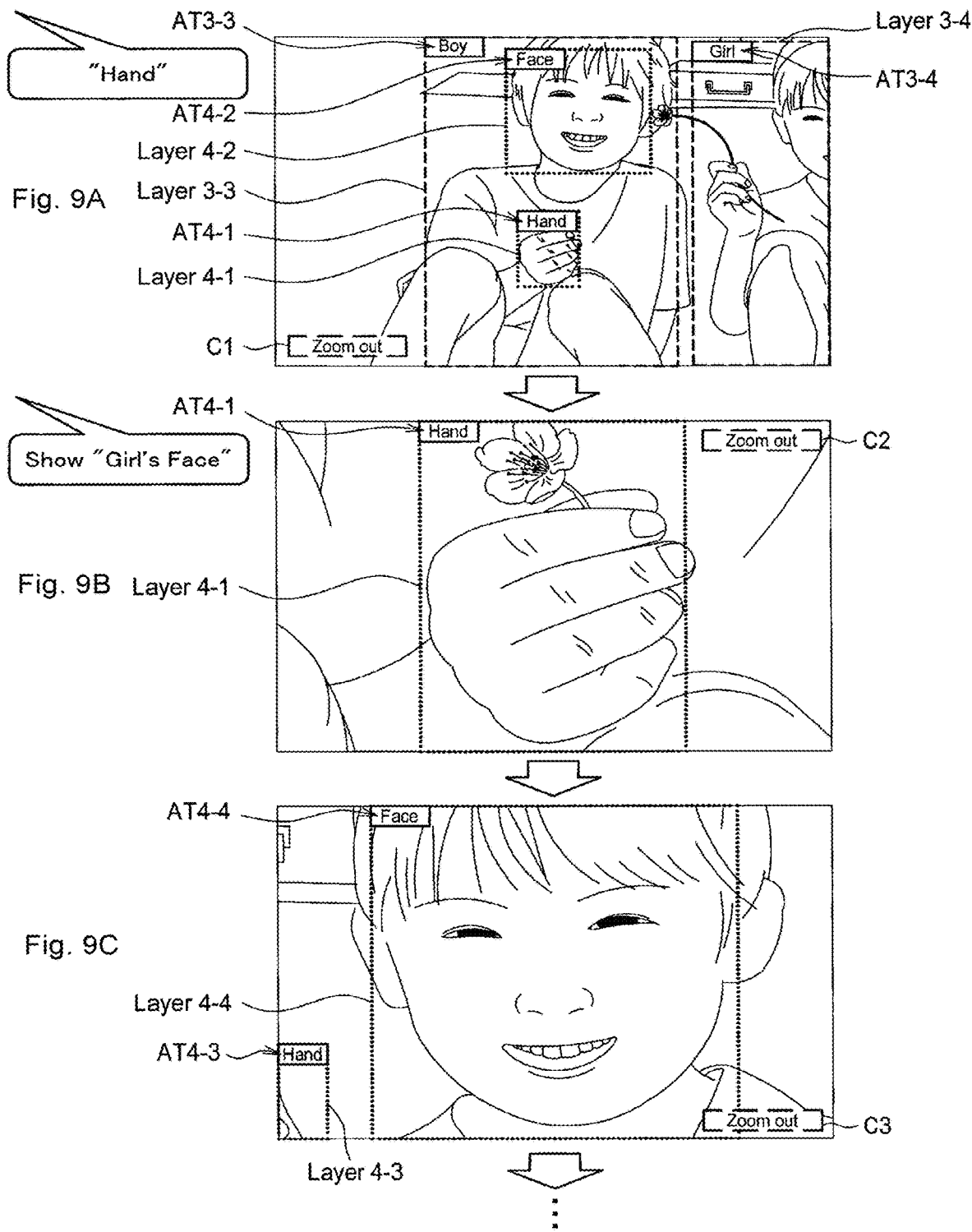

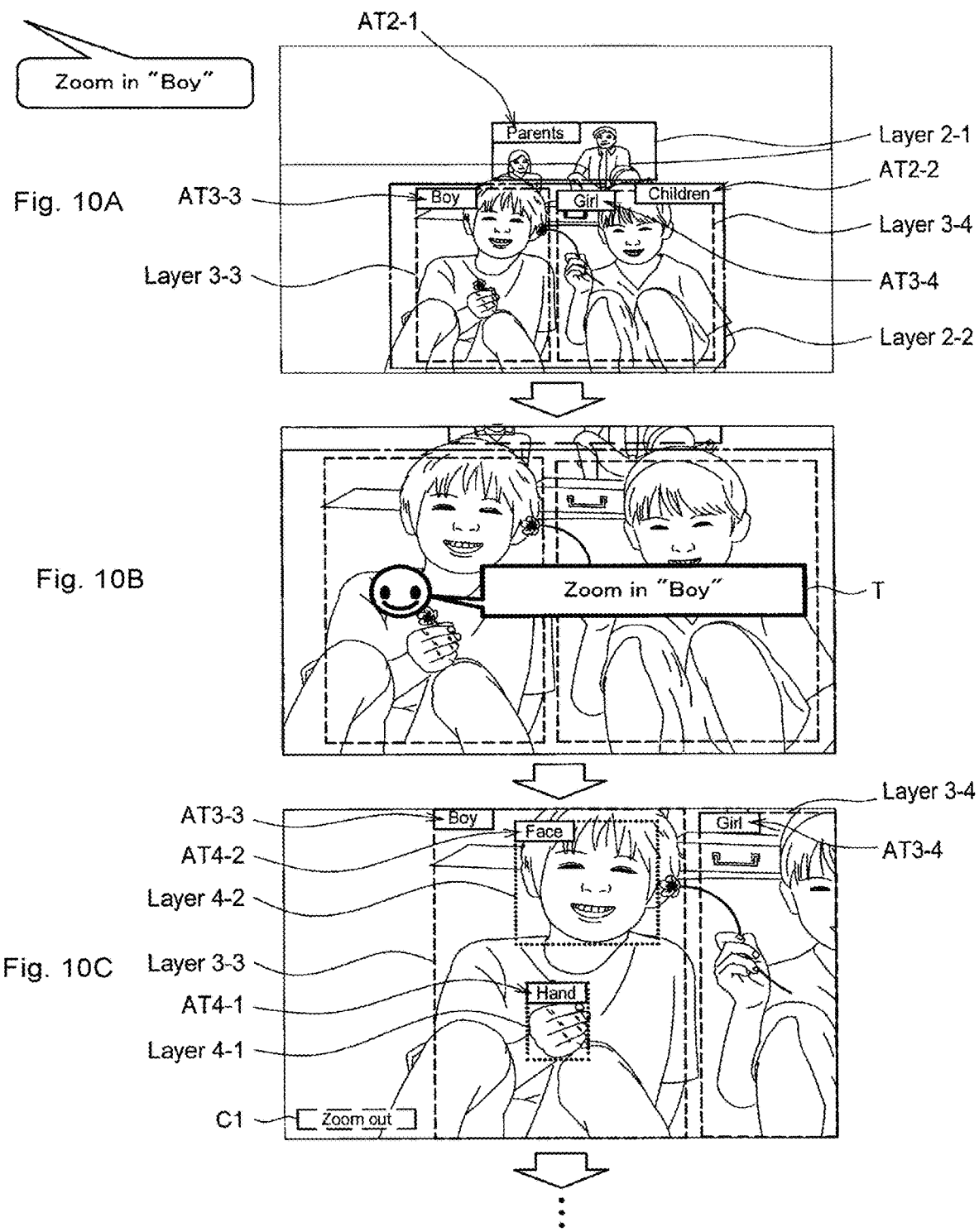

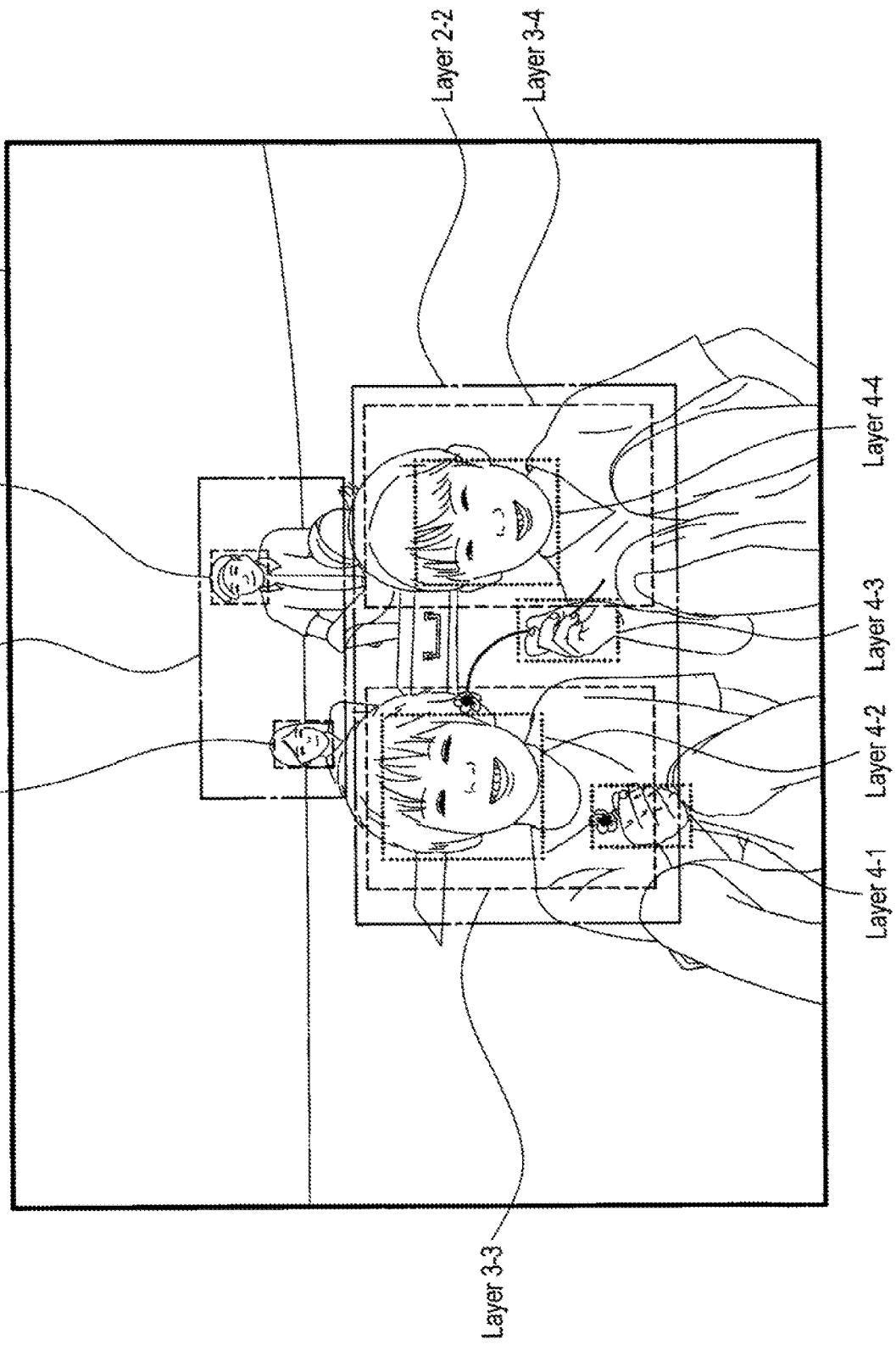

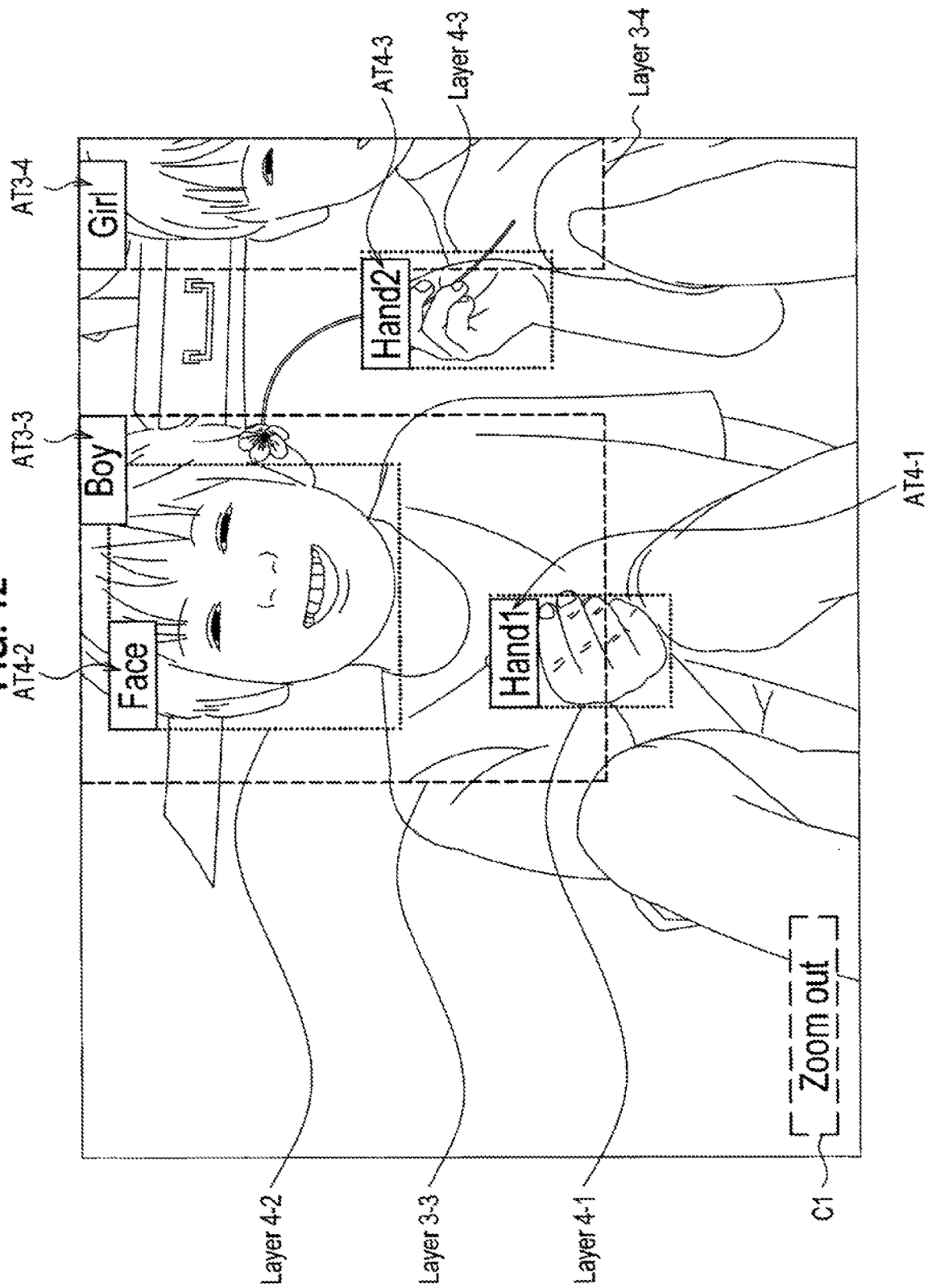

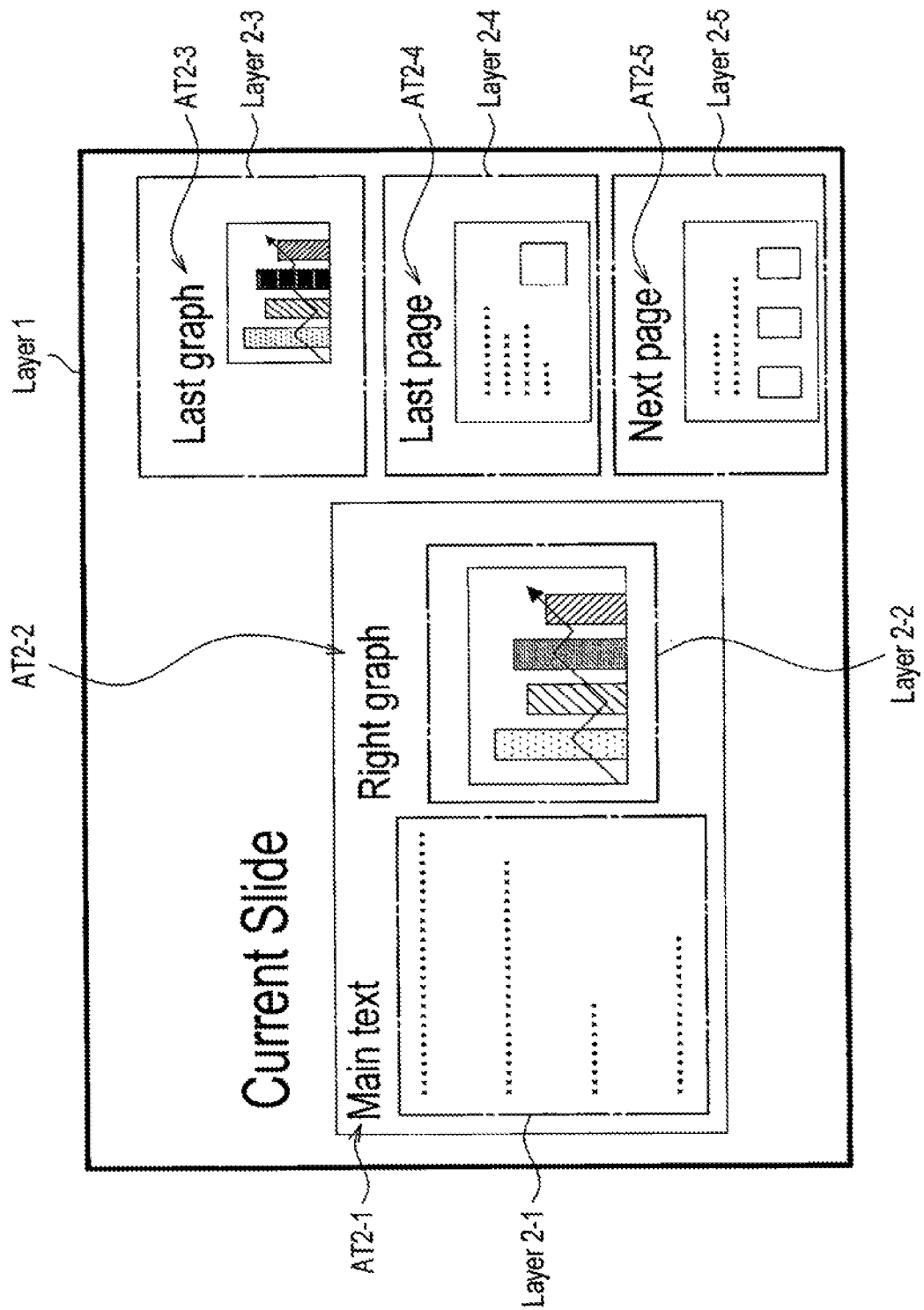

VOICE INPUT APPARATUS

CROSS REFERENCE TO RELATED APPLICATIONS

This application is a continuation of U.S. application Ser. No. 14/273,735, filed May 9, 2014, and claims the benefit of priority under 35 U.S.C. § 119 of Japanese Application No. 2013-144449, filed Jul. 10, 2013.

BACKGROUND

The present disclosure relates to a voice input device, a voice input method, and a program.

Of user interfaces of computers, natural user interfaces (NUIs) realizing manipulations in more natural and more intuitive operations for users have recently been popularized widely. Well-known natural user interfaces are NUIs in which voices spoken by users, gestures made by users, or the like are used as input manipulations. Such input manipulations are individually used in many cases. However, for example, JP 2012-103840A discloses a technology for combining and using an input manipulation by a voice and an input manipulation by a gesture.

SUMMARY

However, for example, when a plurality of UI components are intended to be selectively manipulated by an NUI, it is difficult for a user to understand which symbol (for example, an address term by a voice) is set in order to specify a manipulation target UI component in some cases. Although the technology disclosed in JP 2012-103840A described above contributes to an improvement in a user experience on an NUI, the technology may not necessarily be said to sufficiently deal with the above-mentioned point.

Accordingly, it is desirable to provide a novel and improved information processing device, a novel and improved information processing method, and a novel and improved program capable of notifying a user of a symbol for specifying a manipulation target on an NUI so that the user can easily understand the symbol.

According to an embodiment of the present disclosure, there is provided an information processing device including a processor configured to realize an address term definition function of defining an address term for at least a partial region of an image to be displayed on a display, a display control function of displaying the image on the display and temporarily displaying the address term on the display in association with the region, a voice input acquisition function of acquiring a voice input for the image, and a command issuing function of issuing a command relevant to the region when the address term is included in the voice input.

According to another embodiment of the present disclosure, there is provided an information processing method including, by a processor defining an address term for at least a partial region of an image to be displayed on a display, displaying the image on the display and temporarily displaying the address term on the display in association with the region, acquiring a voice input for the image, and issuing a command relevant to the region when the address term is included in the voice input.

According to still another embodiment of the present disclosure, there is provided a program causing a computer to realize an address term definition function of defining an address term for at least a partial region of an image to be displayed on a display, a display control function of displaying the image on the display and temporarily displaying the address term on the display in association with the region, a voice input acquisition function of acquiring a voice input for the image, and a command issuing function of issuing a command relevant to the region when the address term is included in the voice input.

As described above, according to an embodiment of the present disclosure, it is possible to notify a user of a symbol for specifying a manipulation target on an NUI so that the user can easily understand the symbol.

BRIEF DESCRIPTION OF THE DRAWINGS

FIGS. 8A to 8C are diagrams illustrating a display example of address terms in the second embodiment of the present disclosure;

FIGS. 9A to 9C are diagrams illustrating a display example of the address terms in the second embodiment of the present disclosure;

FIGS. 10A to 10C are diagrams illustrating a first modification example of the second embodiment of the present disclosure;

FIG. 11 is a diagram illustrating a second modification example of the second embodiment of the present disclosure;

FIG. 12 is a diagram illustrating the second modification example of the second embodiment of the present disclosure; and FIG. 13 is a diagram illustrating a display example of an address term in a third embodiment of the present disclosure.

DETAILED DESCRIPTION OF THE EMBODIMENTS

Figure 1:
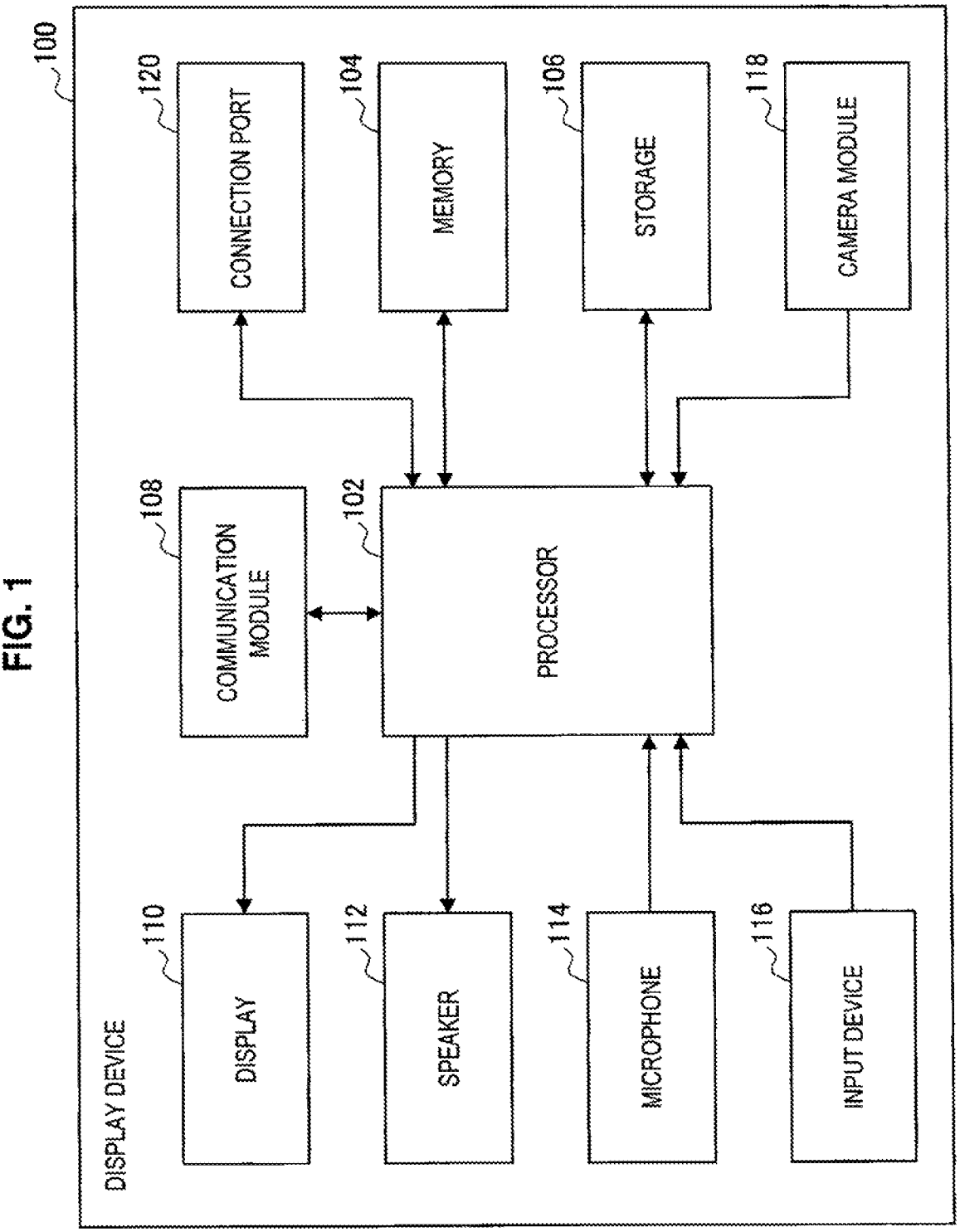
FIG. 1 is a block diagram illustrating an overall configuration of a display device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. System configuration
1-1. Hardware configuration
1-2. Functional configuration
1-3. Layered structure of regions 1-4. Display example of address term
2. Second Embodiment
2-1. Layered structure of regions
2-2. Display example of address term
2-3. Modification examples
3. Third Embodiment
4. Supplement 1. System Configuration 1-1. Hardware Configuration FIG. 1 is a block diagram illustrating an overall configuration of a display device according to an embodiment of the present disclosure. Referring to FIG. 1, a display device 100 includes a processor 102, a memory 104, a storage 106, a communication module 108, a display 110, a speaker 112, a microphone 114, an input device 116, a camera module 118, and a connection port 120.

The display device 100 may be any of the various devices that display an image on a display 110 according to a user's desire. For example, the display device 100 may be a television, a personal computer (PC), a tablet terminal, a smartphone, a portable media player, or a portable game device including the display 110. For example, the display device 100 may be a PC, a set-top box, a recorder, or a game device connected to the separately configured displayed 110 and controlling the display 110. Hereinafter, the constituent elements of the display device 100 will be further described.

The processor 102 is realized by, for example, a central processing unit (CPU), a digital signal processor (DSP), or an application specific integrated circuit (ASIC) and operates according to programs stored in the memory 104 to realize various functions. The processor 102 acquires various inputs by controlling each unit of the display device 100 and provides various outputs. The detailed functions realized by the processor 102 will be described below.

The memory 104 is realized by, for example, by a semiconductor memory used as a random access memory (RAM) or a read-only memory (ROM). The memory 104 stores, for example, programs causing the processor 102 to operate. For example, the programs may be read from the storage 106 and may be temporarily loaded on the memory 104 or the programs may be permanently stored in the memory 104. Alternatively, the programs may be received by the communication module 108 and may be loaded temporarily on the memory 104. Also, the memory 104 temporarily or permanently stores various kinds of data generated through processes of the processor 102.

The storage 106 is realized by, for example, a storage device such as a magnetic disk such as a hard disk drive (HDD), an optical disc, or a magneto-optical disc or a flash memory. The storage 106 permanently stores, for example, programs causing the processor 102 to operate or various kinds of data generated through processes of the processor 102. The storage 106 may be configured to include a removable medium or may be included in the display device 100.

The communication module 108 is realized by any of the various communication circuits performing wired or wireless network communication under the control of the processor 102. When wireless communication is performed, the communication module 108 may include an antenna. For example, the communication module 108 performs network communication in conformity with a communication standard of the Internet, a local area network (LAN), Bluetooth®, or the like.

The display device 100 includes the display 110 and the speaker 112 as output units. The display 110 is realized by, for example, a liquid crystal display (LCD) or an organic electro-luminescence (EL) display. As described above, the display 110 may be integrated with the display device 100 or may be a separate display. The display 110 displays various kinds of information as images under the control of the processor 102. An example of an image displayed on the display 110 will be described below. The speaker 112 outputs various kinds of information as voices under the control of the processor 102.

For example, the microphone 114 acquires diverse kinds of voices, such as voices spoken by a user, produced in the vicinity of the display device 100, and supplies the voices as voice data to the processor 102. Here, in the embodiment, the microphone 114 is used as a voice input unit on the NUI. That is, the voice data provided by the microphone 114 is analyzed by the processor 102 and various commands are executed based on the voices or the like spoken by the user and extracted from the voice data.

The input device 116 is another input unit used in the display device 100. The input device 116 may include, for example, a keyboard, a button, or a mouse. The input device 116 may include a touch sensor arranged at a position corresponding to the display 110 so that a touch panel is configured by the display 110 and the touch sensor. When the display device 100 can be sufficiently manipulated by a voice input using the microphone 114, the separate input device 116 may not be installed.

The camera module 118 is realized by, for example, an image sensor such as a charge coupled device (CCD) or a complementary metal oxide semiconductor (CMOS), an optical system such as a lens controlling formation of a subject image in the image sensor, and a driving circuit driving the image sensor and the optical system. The camera module 118 supplies a still image or a moving image generated by capturing the subject image by the image sensor as image data to the processor 102. The still image or the moving image generated by the camera module 118 may be displayed as, for example, a through image or a recorded image on the display 110.

The connection port 120 is a port directly connecting an external device to the display device 100 and is realized by, for example, a Universal Serial Bus (USB) port, an IEEE 1394 port, or a High-Definition Multimedia Interface (HDMI)® port. In the illustrated example, the storage 106, the display 110, the speaker 112, the microphone 114, and the input device 116 are connected to the processor 102 internally (for example, by a bus or the like), but such constituent elements may be separate from the display device 100. In this case, for example, a display device (an external display or the like), an input device (a keyboard, a mouse, or the like), or a storage device (an external HDD or the like) can be connected to the connection port 120. Devices connected to the connection port 120 are not limited to these examples, but various devices other than the above-described devices may be connected.

1-2. Functional Configuration

Figure 2:
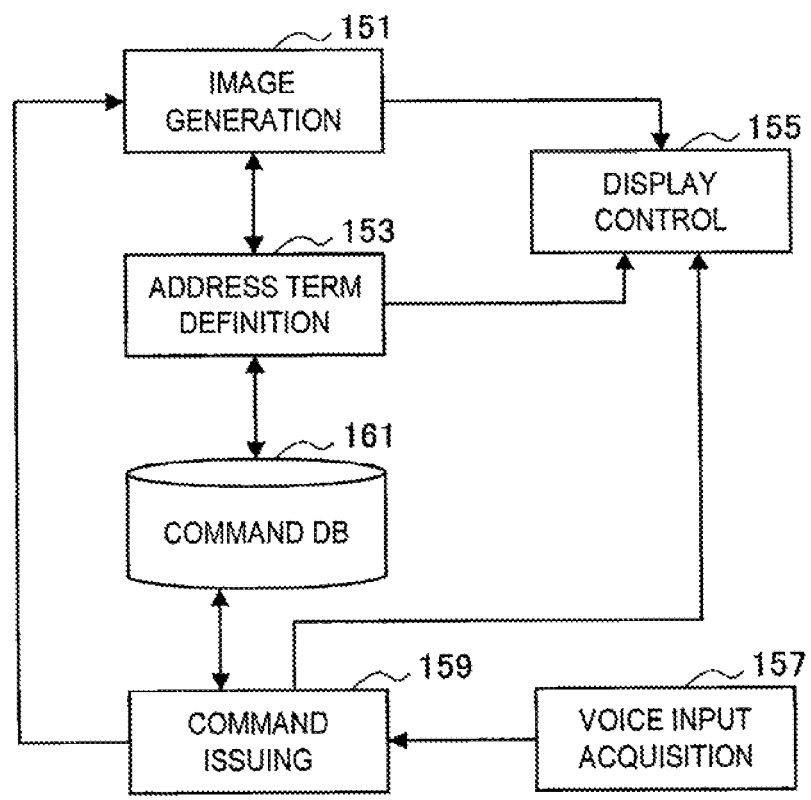
FIG. 2 is a diagram illustrating an overall functional configuration realized in the display device according to an embodiment of the present disclosure.

FIG. 2 is a diagram illustrating an overall functional configuration realized in the display device according to an embodiment of the present disclosure. Referring to FIG. 2, in the display device 100, an image generation function 151, an address term definition function 153, a display control function 155, a voice input acquisition function 157, and a command issuing function 159 can be realized.

Such functions are realized, for example, when the processor 102 of the display device 100 operates according to programs stored in the memory 104. Any of the foregoing functions refers to a command DB 161. The command DB 161 may be stored in the storage 106 of the display device 100 and a part or the entirety of the command DB 161 may be read to the memory 104, as necessary.

(Image Generation Function)

The image generation function 151 generates an image to be displayed on the display 110 of the display device 100. For example, the image may include a content image such as a photo or a video or an image of a document (including, for example, web pages described by the hypertext markup language (http)) described in various formats. The image may include a graphical user interface (GUI) image used to manipulate the display device 100. For example, data for displaying such an image may be read from the storage 106 or may be acquired from a server or the like on a network via the communication module 108. The image generated by the image generation function 151 is displayed on the display 110 by the display control function 155.

For example, the image generation function 151 can generate an image including a plurality of sub-images. The sub-images may be, for example, content images, document images, or GUI images and may include images displayed on the display 110 by arranging such images in predetermined regions. In this case, the image generation function 151 can expand and display any of the sub-images on the entire region (full screen) of the display 110, for example, in response to a command issued by the command issuing function 159.

For example, the image generation function 151 can generate an image in which a subject image is defined. The image may be, for example, a content image such as a photo or a video and the subject region in the image is recognized through an image recognition process or a setting manipulation of the user. In this case, the image generation function 151 can expand and display an image using any of the subject regions as a criterion, for example, in response to a command issued by the command issuing function 159. For example, such an image may be displayed in the entire region (full screen) of the display 110 or may be one of the foregoing sub-images.

(Address Term Definition Function)

The address term definition function 153 defines an address term regarding at least a partial region of an image generated by the image generation function 151 and displayed on the display 110 by the display control function 155. As described above, in the embodiment, an image displayed on the display 110 can include a region defined as, for example, a sub-image or a subject region in the image. The address term definition function 153 defines an address term for each of the regions so that display of an image on the display 110 can be easily manipulated by a voice input, as will be described below. The address term definition function 153 supplies the defined address term to the display control function 155 to display the address term on the display 110 and stores information regarding the address term in the command DB 161.

For example, the address term definition function 153 defines an address term for each of the display regions of the plurality of sub-images included in the image displayed on the display 110. In this case, for example, the address term definition function 153 may define an address term based on set information of an application function providing each sub-image (for example, address terms such as "web browser" or "media player" can be defined). For example, the address term definition function 153 may define an address term based on a title, text, or the like included in each sub-image (for example, address terms such as "news," "memo," and "movie" can be defined). Here, for example, when an overlapping address term is defined in such an example, the address term definition function 153 may uniquely define the address term by using, for example, a sequence number (for example, address terms such as "web browser 1" and "web browser 2" can be defined). Further, for example, the address term definition function 153 may define an address term based on the location of each sub-image in an image (for example, address terms such as "top left" and "bottom right" can be defined).

Here, for example, when a content image, a document image, or the like (hereinafter also referred to as an application image) which is the foregoing sub-image is expanded and displayed on the entire region of the display 110 in response 5S to a command issued by the command issuing function 159, for example, the address term definition function 153 may define an address term for the region of a GUI component (for example, which can be a button, a tab, an icon, or the like) included in an application image. In this case, for example, the address term definition function 153 may define an address term based on information regarding the GUI component defined in a program providing an application image (for example, an address term such as "header," "tab," or "address bar" can be defined).

For example, the address term definition function 153 defines an address term for each of a plurality of subject regions included in an image displayed on the display 110. In this case, for example, the address term definition function 153 may define an address term based on a result of newly performed image analysis or information added as metadata to an image. Here, for example, when a subject can be identified by the result of the image analysis or the name of a subject is recorded as metadata, the address term definition function 153 may define an address term of a subject region based on the name of the subject (for example, an address term such as "parents," "children," "hands," or "faces" can be defined. Otherwise, for example, the address term definition function 153 may define an address term based on the position of each subject region in an image (for example, an address term such as "top left" or "bottom right" can be defined).

For example, the address term definition function 153 defines an address term for a manipulation on an image displayed on the display 110. The "manipulation on an image" mentioned here can be distinguished from manipulations of other examples in the manipulation is a manipulation performed without designation of a specific region in an image. The address term defined here can be an address term for the entire region of the image displayed on the display 110. In this case, for example, the address term definition function 153 may define an address term based on the name of a manipulation command stored in advance in the command DB 161 (for example, an address term such as "zoom out" or "scroll down" can be defined).

(Display Control Function)

The display control function 155 displays an image generated by the image generation function 151 on the display 110 and temporarily displays address terms defined by the address term definition function 153 on the display 110 in association with regions corresponding to the address terms in the image. For example, the display control function 155 displays the address term as text at locations somewhere in the corresponding regions. The display control function 155 may display frame borders or the like indicating the regions corresponding to the address terms and may display the address terms and the frame borders or the like in association therewith.

As described above, the address terms (and the frame borders or the like) by the display control function 155 are temporarily displayed. For example, the display control function 155 may start the display of an image newly generated by the image generation function 151 on the display 110 and then display the address terms (and the frame borders or the like) on the display 110 only for a predetermined time. After the predetermined time passes, only the image generated by the image generation function 151 can be displayed on the display 110.

Thus, when the address terms defined by the address term definition function 153 are temporarily displayed on the display 110 in association with the regions corresponding to these address terms, the user can easily recognize by which address term the user may specify a manipulation target when manipulating the display device 100 using a voice input, as will be described below. Also, the address terms (and the frame borders or the like) are temporarily displayed. For example, by biding the address terms after a predetermined time passes, it is possible to ensure visibility of an image displayed on the display 110.

For example, the display control function 155 can resume the display of the address terms (and the frame borders or the like) according to a command issued by the command issuing function 159. In this case, the display control function 155 may continue to display the address terms (and the frame borders or the like), for example, until a separate command is issued from the command issuing function 159.

(Command DB)

The command DB 161 stores the information regarding the address terms defined by the address term definition function 153, as described above. The information regarding the address term can include, for example, the address term itself and information for specifying a region specified by the address term in an image. For example, when an address term is set to correspond to a display region of a sub-image, identification information (for example, which can be a process ID, a window ID, or the like) of an application function providing the sub-image can be stored along with the address term. For example, when an address term is set to correspond to the region of a GUI component included in an application image, identification information (for example, which can be an ID given to a button, a tab, or the like) of the GUI component can be stored along with the address term. For example, when an address term is set to correspond to a subject region, identification information (for example, which can be coordinate information in an image) of the subject region can be stored along with the address term.

The command DB 161 stores the names of manipulation commands defined in advance. For example, as described above, the names of the manipulation commands are referred to when the address term definition function 153 sets the address term for a manipulation on an image displayed on the display 110 and are also referred to when the command issuing function 159 to be described below analyzes a voice input from the user. The manipulation commands include manipulation commands performed without designating specific regions in an image, as described above, and also include manipulation commands performed by designating specific regions in an image (for example, which can be manipulation commands such as "zoom in" and "select"). The command issuing function 159 specifies a kind of command instructed by a voice input by referring to the name of the manipulation command stored in the command DB 161 and also specifies a region of a target by referring to information regarding the names stored in the command DB 161.

(Voice Input Acquisition Function)

The voice input acquisition function 157 acquires a voice input for an image displayed on the display 110. More specifically, when an image is displayed on the display 110 by the display control function 155, the voice input acquisition function 157 acquires the voice input of the user acquired via the microphone 114. As described above, since the microphone 114 acquires diverse kinds of voices a produced near the display device 100, the voice input acquisition function 157 may perform a process of extracting a predetermined voice such as a speech of the user from acquired voice data. Alternatively, apart from the voice input acquisition function 157, a preprocessing unit (not illustrated) performing the foregoing process may be provided.

(Command Issuing Function)

When the voice input acquired by the voice input acquisition function 157 includes an address term defined by the address term definition function 153, the command issuing function 159 issues a command relevant to the region corresponding to the address term. More specifically, based on text extracted through voice recognition from the acquired voice input, the command issuing function 159 retrieves the address term and the name of the manipulation command included in the text with reference to the command DB 161. When the corresponding address term and the name of the manipulation command are found, the command issuing function 159 issues the manipulation command corresponding to the name included in the text with respect to the region corresponding to the address term included in the text. The command can be issued to, for example, the image generation function 151 or the display control function 155.

For example, when an image displayed on the display 110 includes a plurality of sub-images, the command issuing function 159 issues a command for expanding and displaying any of the sub-images on the entire region (full screen) of the display 110 to the image generation function 151. At this time, which sub-image is expanded and displayed can be determined based on the address term included in the voice input with reference to the command DB 161.

For example, when an image displayed on the display 110 includes a plurality of subject regions, the command issuing function 159 issues a command for expanding and displaying the image using any of the subject regions as a criterion to the image generation function 151. At this time, which subject region is used as the criterion to expand and display the image can be determined based on the address term included in the voice input with reference to the command DB 161.

1-3. Layered Structure of Regions

Figure 3:
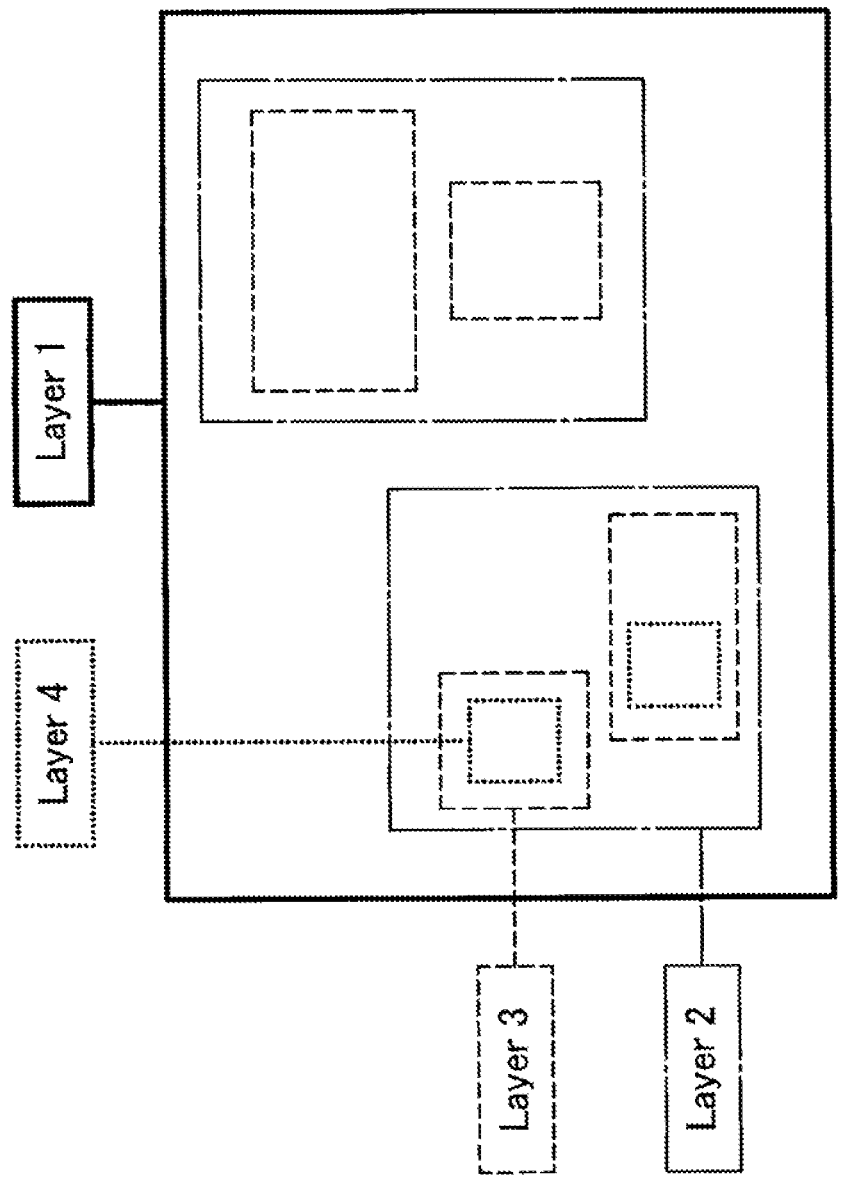
FIG. 3 is a diagram for describing a layered structure of regions in an image defined in a first embodiment of the present disclosure.
Figure 4:
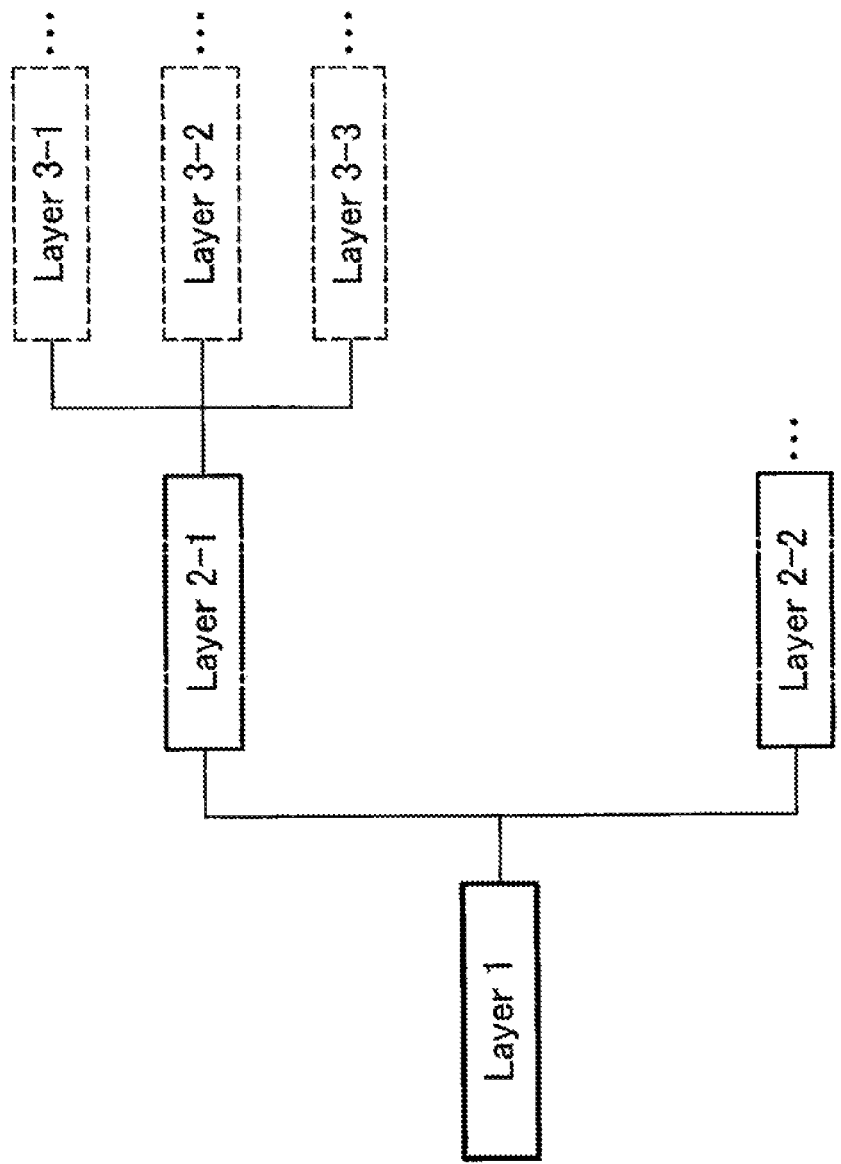
FIG. 4 is a diagram for describing the layered structure of the regions in the image defined in the first embodiment of the present disclosure.

FIGS. 3 and 4 are diagrams for describing a layered structure of regions in an image defined in a first embodiment of the present disclosure. In the embodiment, regions in an image for which address terms are defined by the address term definition function 153 can be set according to a layered structure to be described below.

In an example illustrated in FIG. 3, four layers, Layer 1 to Layer 4, have superordinate and subordinate relations. That is, a region of Layer 1 is a superordinate-layer region of a region of Layer 2, a region of Layer 2 is a superordinate-layer region of a region of Layer 3, and a region of Layer 3 is a superordinate-layer region of a region of Layer 4. In the embodiment, a subordinate layer region is included in a superordinate layer region. In the illustrated example, all of the subordinate layer regions are included in a superordinate layer region. In another example, however, at least some of the subordinate layer regions may be included in a superordinate layer region.

In the embodiment, such a layered structure is used to select a region in an image for which an address term is displayed. In the case of the example illustrated in FIG. 3, for example, when address terms are displayed for all of the regions from Layer 1 to Layer 4 on the display 110 along with an image, there is a probability of visibility of the image being damaged even in temporary display. Accordingly, when a superordinate layer region is displayed on the display 110, the display control function 155 can display address terms of subordinate layer regions included in the displayed superordinate layer region on the display 110.

That is, for example, when a region (superordinate layer region) of Layer 1 is displayed on the display 110, the display control function 155 displays the address terms of regions (subordinate layer regions) of Layer 2 included in the region of Layer 1 on the display 110. For example, when any region (superordinate layer region) of the two regions of Layer 2 is displayed on the display 110 in the illustrated example, the display control function 155 displays the address terms of regions (subordinate layer regions) of Layer 3 included in the displayed region of Layer 2 on the display 110.

For example, the layered structure described above may be defined as a parent-child relation or a link relation as in the example illustrated in FIG. 4. The illustrated example shows a case in which two regions (layer 2-1 and Layer 2-2) of Layer 2 are included in a region (only one region is set and corresponds to the entire image, for example) of Layer 1, three regions (Layer 3-1, Layer 3-2, and Layer 3-3) of Layer 3 are included in Layer 2-1, and so on. Such a relation is specified when the address term definition function 153 defines an address term for each region. Thereafter, the address term can be used by the display control function 155 or the command issuing function 159. A specific use example of the layered structure of the regions will be described below.

1-4. Display Example of Address Term

Figure 5:
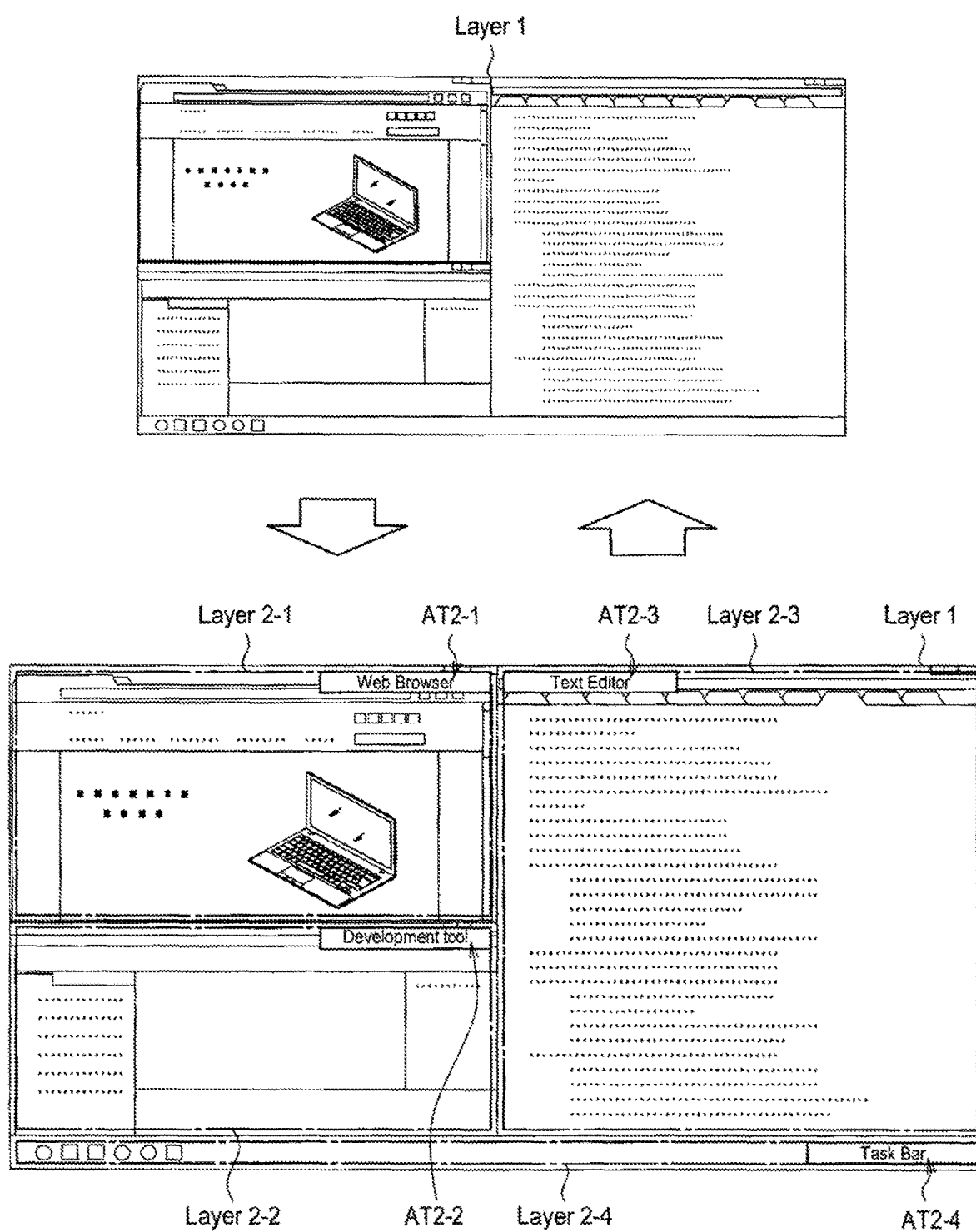
FIG. 5 is a diagram illustrating a display example of address terms in the first embodiment of the present disclosure.
Figure 6:
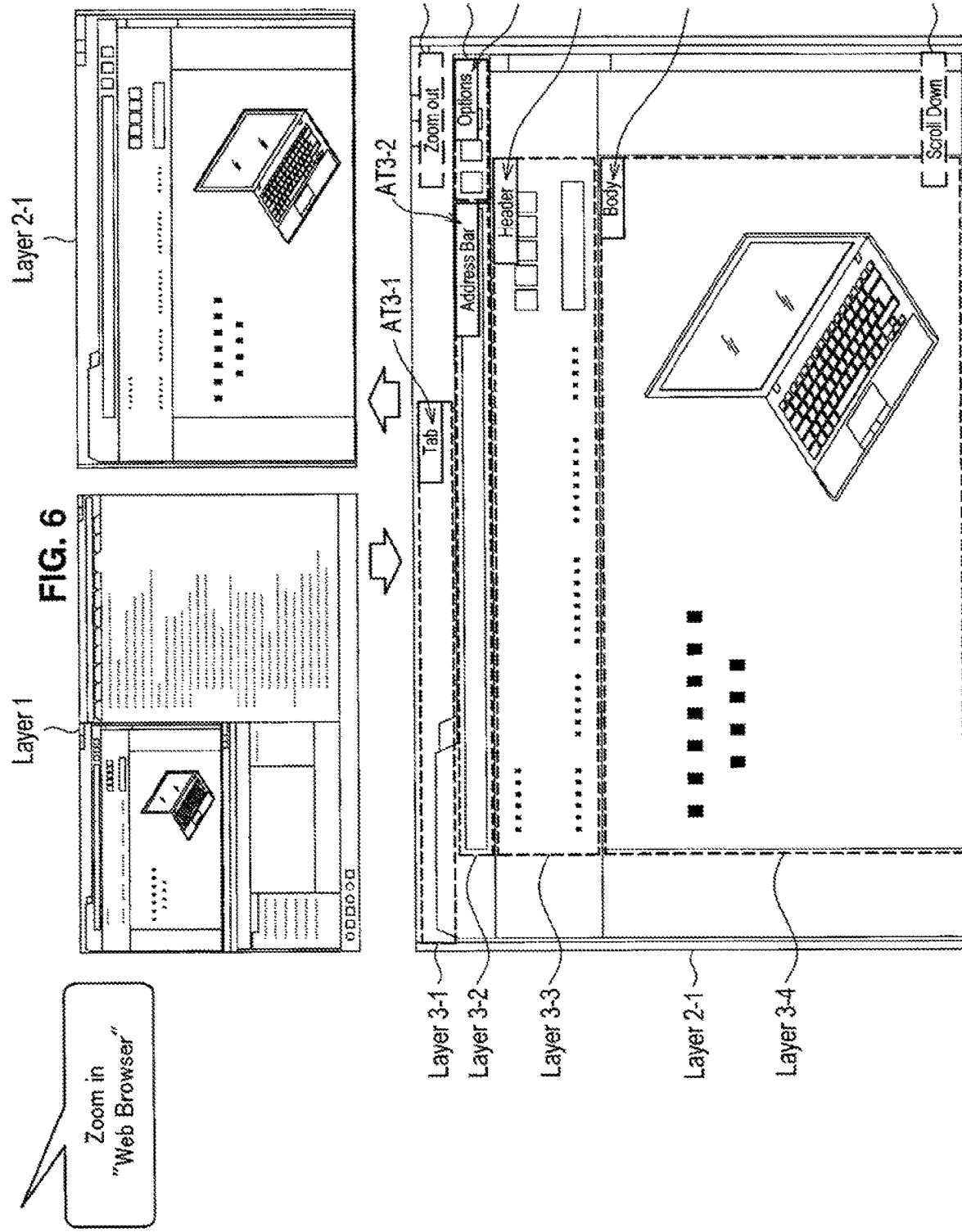
FIG. 6 is a diagram illustrating a display example of the address terms in the first embodiment of the present disclosure.

FIGS. 5 and 6 are diagrams illustrating display examples of address terms according to the first embodiment of the present disclosure. In the embodiment, for example, as illustrated in the example of FIG. 5, an address term is defined for each of the display regions of a plurality of sub-images included in an image displayed on the display 110. In the illustrated example, a region of Layer 1 is set to correspond to the entire image displayed on the display 110, and regions of Layer 2 are defined for display regions of sub-images included in the image. The address term definition function 153 can define an address term to correspond to each of the display regions of a web browser (Layer 2-1), a development tool (Layer 2-2), a text editor (Layer 2-3), and a task bar (Layer 2-4). In this example, the display device 100 can be, for example, a PC.

At this time, the display control function 155 displays the image (the region of Layer 1) on the display 110 and temporarily displays an address term defined for a region corresponding to each sub-image and a frame border indicating a region corresponding the address term on the display 110. In the drawing, the address term AT2-1 corresponding to the region of Layer 2-1 (web browser), the address term AT2-2 corresponding to the region of Layer 2-2 (development tool), the address term AT2-3 corresponding to the region of Layer 2-3 (text editor), and the address term AT2-4 corresponding to the region of Layer 2-4 (task bar) are temporarily displayed on the display 110 by the display control function 155.

Thereafter, when display of the image (the region of Layer 1) starts and a predetermined time passes, the display control function 155 ends the display of the frame borders of the address terms AT2-1 to AT2-4 and the display returns to display of only the image (the region of Layer 1). The user can perform a manipulation on the regions corresponding to the address terms AT2-1 to AT2-4 during or after the display of the address terms AT2-1 to AT2-4 by giving a voice input including the address terms AT2-1 to AT2-4 to the display device 100. For example, when the user says "Zoom in 'web browser'" a zoom-in manipulation can be performed on a display region of a web browser corresponding to the region of Layer 2-1, as will be described below, by the command issuing function 159 to which this voice input is supplied by the voice input acquisition function 157. For example, when the user says "Hide Task Bar," display of a task bar corresponding to the region of Layer 2-4 can be hidden.

In the example illustrated in FIG. 6, a change of the display is shown when the user says "Zoom in 'web browser'" in the first example illustrated in FIG. 5. In this case, the command issuing function 159 finds the address term of a manipulation command "Zoom in" and the address term "web browser" (corresponding to the address term AT2-1 displayed in the example of FIG. 5) based on text extracted through voice recognition from the voice input of the foregoing speech with reference to the command DB 161. Thus, the command issuing function 159 issues a command to give a request for expanding and displaying the sub-image (corresponding to the region of Layer 2-1) of the web browser in the entire region of the image displayed on the display 110 to the image generation function 151. In response to this command, the image generation function 151 changes the image displayed on the display 110 from the image for displaying the region of Layer 1 to an image for expanding and displaying the entire region of Layer 2-1.

At this time, the display control function 155 displays a new image (the region of Layer 2-1) on the display 110 and temporarily displays the address term defined for the region of the GUI component included in the image and the frame border indicating the region corresponding to this address term on the display 110. In the drawing, an address term AT3-1 corresponding to the region of Layer 3-1 (tab), an address term AT3-2 corresponding to the region of Layer 3-2 (address bar), an address term AT3-3 corresponding to the region of Layer 3-3 (header), an address term AT3-4 corresponding to the region of Layer 3-4 (body), and an address term AT3-5 corresponding to the region of Layer 3-5 (options) are temporarily displayed on the display 110 by the display control function 155.

In the illustrated example, for example, the address terms AT3-1 to AT3-5 temporarily displayed when the new image (the region of Layer 2-1) is displayed on the display 110 may be newly defined by the address term definition function 153. Alternatively, for example, when the region of Layer 2-1 is displayed as the sub-image in the image of the region of Layer 1, the address terms AT3-1 to AT3-5 may be defined by the address term definition function 153 and may be stored along with data of the layered structure illustrated in FIG. 4 in the command DB 161 or the like.

The display control function 155 temporarily displays address terms C1 (corresponding to a manipulation of zoom out) and C2 (corresponding to a manipulation of scroll down) in the manipulation on the image displayed on the display 110 along with the foregoing address terms AT3-1 to AT3-5 on the display 110. Since the image of the web browser is displayed in the entirety of the new image (the region of Layer 2-1) displayed on the display 110, for example, a manipulation such as zoom out or scroll down can be performed without designating a specific region in the image. Thus, the address term definition function 153 extracts the names of manipulation commands executable for the image of the web browser among the address terms of the manipulation commands stored in advance in the command DB 161, the address term definition function 153 defines address terms corresponding to the extracted names of the manipulation commands. As a result, the display control function 155 temporarily displays the address terms C1 and C2 on the display 110. For example, positions at which the address terms C1 and C2 are displayed can be near ends or near corners of the display 110 so that view of displayed images is not obstructed.

Thereafter, when the display of the image (the region of Layer 2-1) starts and a predetermined time passes, the display control function 155 ends the display of the address terms AT3-1 to AT3-5 and the frame borders, and the display of the address terms C1 and C2 and the display returns to display of only the image (the region of layer 2-1). Even after the display of the address terms AT3-1 to AT3-5 and the address terms C1 and C2, the user can perform a manipulation on the regions corresponding to the address terms AT3-1 to AT3-5 or the address terms C1 and C2 by giving a voice input including the address terms AT3-1 to AT3-5 or the address terms C1 and C2 to the display device 100.

When the user gives a predetermined voice input (for example, "Show Commands") to the display device 100, the command issuing function 159 issues a command to give a request for displaying the address terms AT3-1 to AT3-5 and the frame borders and displaying the address terms C1 and C2 again on the display 110 to the display control function 155. In response to this command, the display control function 155 displays the foregoing address terms and the frame borders again on the display 110. The address terms and the frame borders displayed at this time may disappear at a predetermined time after start of the display of the address terms and the frame borders, as in the initial display of the address terms and the frame borders, or may be set not to disappear automatically in consideration of intentional calling of the user. In this case, when the user gives another predetermined voice input (for example, "Hide Commands") to the display device 100, the display control function 155 can end the display of the address terms and the frame borders.

2. Second Embodiment

Next, a second embodiment of the present disclosure will be described. Since a configuration in the second embodiment is almost the same as that in the foregoing first embodiment except for configuration examples of regions and display examples of address terms to be described below, detailed description other than that of the configuration examples and the display examples will be omitted.

2-1. Layered Structure of Regions

Figure 7:
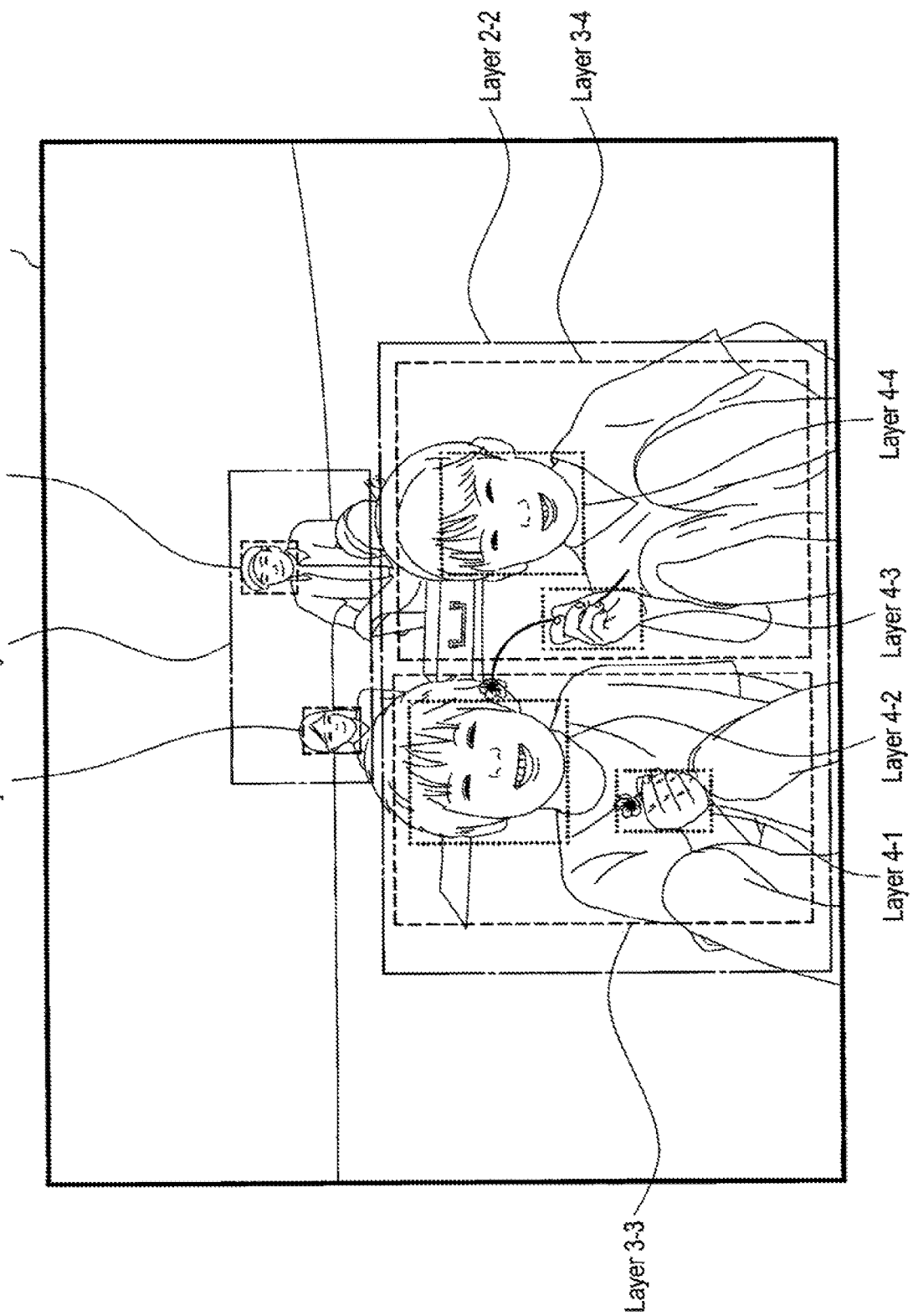
FIG. 7 is a diagram for describing a layered structure of regions in an image defined in a second embodiment of the present disclosure.

FIG. 7 is a diagram for describing a layered structure of regions in an image defined in the second embodiment of the present disclosure. In the embodiment, the entire image of a photo displayed on the display 110 is a region of Layer 1. Two regions (Layer 2-1 and Layer 2-2) of Layer 2 included in the region of Layer 1 are defined. The two regions (Layer 2-1 and Layer 2-2) of Layer 2 include two regions (Layer 3-1 and Layer 3-2) and two regions (Layer 3-3 and Layer 3-4) of Layer 3, respectively. Of the four regions (Layer 3-1 to Layer 3-4) of Layer 3, the two regions (Layer 3-3 and Layer 3-4) further include two regions (Layer 4-1 and Layer 4-2) and two regions (Layer 4-3 and Layer 4-4) of Layer 4, respectively.

The region of each layer equivalent to or subordinate to Layer 2 can include, for example, a subject region specified based on a result of image analysis. In this case, all of the regions may not necessarily be defined based on the result of the image analysis. For example, a region of a superordinate layer (for example, a region of Layer 2) may be a region set later as a region for grouping regions (for example, the regions of Layer 3 and Layer 4) of subordinate layers corresponding to a subject region specified based on the result of the image analysis. Alternatively, the subject region may be specified based on a set manipulation of the user in addition to or instead of the image analysis. For example, the subject region may include a region determined when the user approves or corrects candidate regions suggested based on the result of the image analysis. For example, such a region may be defined in advance by metadata incidental on image data of a photo or may be newly defined based on a result obtained by performing image analysis at the time of display of an image.

2-2. Display Example of Address Term

FIGS. 8A and 9C are diagrams illustrating display examples of address terms according to the second embodiment of the present disclosure. In the embodiment, for example, as illustrated in the example of FIG. 7, an address term is defined for each of a plurality of subject regions included in an image displayed on the display 110. In the illustrated example, the region of Layer 1 is set to correspond to the entire image of a photo displayed on the display 110 (or the image of the photo may not necessarily be displayed on the entire display 110, that is, the image of the photo may be displayed as one of the sub-images in the foregoing first embodiment) and regions equivalent to or subordinate to Layer 2 are defined for the subject regions included in the image.

First, as illustrated in FIG. 8A, when an image (the region of Layer 1) is displayed on the display 110, the display control function 155 temporarily displays an address term defined for the region corresponding to each of the regions of Layer 2 and a frame border indicating the region corresponding to the address term on the display 110. In the drawing, an address term AT2-1 corresponding to the region of Layer 2-1 and an address term AT2-2 corresponding to the region of Layer 2-2 are temporarily displayed on the display 110 by the display control function 155.

Here, the address term definition function 153 defines address terms displayed as the address terms AT2-1 and AT2-2, for example, based on the names of subjects specified by image analysis or an input from the user. For example, when metadata incidental to the image data of the photo records the fact that subjects included in the region of Layer 2-1 are parents and subjects included in the region of Layer 2-2 are children, the address term generation function can define address terms for the region of Layer 2-1 and the region of Layer 2-2 as "parents" and "children," respectively.

Thereafter, when the display of the image (the region of Layer 1) starts and a predetermined time passes, the display control function 155 ends the display of the address terms AT2-1 to AT2-2 and the frame borders and the display returns to the display of a simple image (the region of Layer 1). The user can perform a manipulation on the regions corresponding to the address terms AT2-1 and AT2-2 during or after the display of the address terms AT2-1 and AT2-2 by giving a voice input including the address terms AT2-1 and AT2-2 to the display device 100. In the illustrated example, before the display of the address terms and the frame borders end, the user gives a voice input "Select 'Children'" to the display device 100.

At this time, the command issuing function 159 finds the name of a manipulation command, "Select," and an address term (corresponding to the address term AT2-2 displayed in the example of FIG. 8A) of the region, "Children," based on text extracted through voice recognition from the voice input with reference to the command DB 161. Thus, the command issuing function 159 issues a command to give a request for allowing that the region of Layer 2-2 to enter a selection state to the image generation function 151. In response to this command, the image generation function 151 generates an image for displaying the region of Layer 2-2 in the selection state in the image displayed on the display 110 and the display control function 155 displays this image on the display 110, as illustrated in FIG. 8B. The region of Layer 2-2 can be expressed in the selection state, for example, by darkly displaying a region other than the region of Layer 2-2 or displaying the region of Layer 2-2 in connection with the frame border (the expressions are not necessarily shown in FIG. 8B).

Here, as illustrated in FIG. 8B, the display control function 155 displays a new image (an image in which the region of Layer 2-2 is in the selection state) on the display 110 and temporarily displays address terms defined for more subordinate layer regions included in the region of Layer 2-2 in the selection state, that is, the regions of Layer 3-3 and Layer 3-4, and frame borders indicating the regions corresponding to the address terms along with the address term and the frame border defined for each of the regions of Layer 2 on the display 110. In the drawing, address terms AT3-3 and AT3-4 are further temporarily displayed on the display 110 in addition to the address terms AT2-1 and AT2-2 by the display control function 155.

Thereafter, when the display of the image (the image in which the region of Layer 2-2 is in the selection state) starts and a predetermined time passes, the display control function 155 ends the display of the foregoing address terms and frame borders and the display returns to the display of the simple image (the image in which the region of Layer 2-2 is in the selection state). The user can perform a manipulation on the regions corresponding to the address terms during and after the display of the address terms and the frame borders by giving a voice input including the address terms to the display device 100. In the illustrated example, before the display of the address terms and the frame borders ends, the user gives a voice input "Zoom in 'Boy'" to the display device 100.

At this time, the command issuing function 159 finds the name of a manipulation command. "Zoom in," and an address term of the region, "Boy," based on text extracted through voice recognition from the voice input with reference to the command DB 161. Thus, the command issuing function 159 issues a command to give a request for expanding and displaying the image using the region of Layer 3-3 as a criterion to the image generation function 151. In response to this command, the image generation function 151 generates an image expanded using the region of Layer 3-3 as the criterion and the display control function 155 displays this image on the display 110, as illustrated in FIG. 8C. In the foregoing state of FIG. 8B, by temporarily displaying the address terms (AT3-3 and AT3-4) of some of the regions of Layer 3 on the display 110 in addition to the address terms (AT2-1 and AT2-2) of the regions of Layer 2, the expansion and display of the image using the region of Layer 3-3 as the criterion can be realized right away (the regions of Layer 2 are skipped) from the state in which the image of the region of Layer 1 is displayed.

Here, as illustrated in FIG. 8C, the display control function 155 displays a new image (the image expanded using the region of Layer 3-3 as the criterion) on the display 110 and temporarily displays address terms defined for more subordinate layer regions included in the region of Layer 3-3 used as the criterion of the expansion, that is, the regions of Layer 4-1 and Layer 4-2, and frame borders indicating the regions corresponding to the address terms along with the address term and the frame border defined for the region of Layer 3-3 on the display 110.

In the illustrated example, since the image is expanded and displayed using the region of Layer 3-3 as the criterion and the region of Layer 3-3 is not necessarily displayed on the entire display 110 (in many cases, an aspect ratio of the subject region does not match an aspect ratio of the display 110), it can be useful to display the address terms and the regions defined for the region of Layer 3-3 even after the image is expanded and displayed.

As illustrated in FIG. 8C, when a region (the region of Layer 3-4) other than the region of Layer 3 (the layer to which the image serving as the criterion of the expansion belongs) is included in a display range of the new image (the image expanded using the region of Layer 3-3 as the criterion), an address term and a region defined for the region of Layer 3-4 may also be temporarily displayed on the display 110 by the display control function 155.

In the step shown in FIG. 8C, the display control function 155 temporarily displays an address term C1 (corresponding to a manipulation of zoom out) for a manipulation on the image displayed on the display 110 along with the foregoing address term on the display 110. Since the original image is expanded and displayed in the new image (the image expanded using the region of Layer 3-3 as the criterion) displayed on the display 110, for example, the manipulation of zoom out can be performed without designating a specific region in the image. Thus, the address term definition function 153 extracts the names of manipulation commands executable on the image among the names of the manipulation commands stored in advance in the command DB 161 and defines address terms corresponding to the extracted names of the manipulation commands. As a result, the display control function 155 temporarily displays the address term C1 on the display 110.

Thereafter, when the display of the image (the image expanded using the region of Layer 3-3 as the criterion) starts and a predetermined time passes, the display control function 155 ends the display of the foregoing address terms and frame borders and the display returns to the display of the simple image (the image expanded using the region of Layer 3-3 as the criterion). The user can perform a manipulation on the regions corresponding to the address terms during or after the display of the address terms by giving a voice input including the address terms to the display device 100. In the illustrated example, as illustrated in FIG. 9A, the user gives a voice input "Hand" to the display device 100 before the display of the address terms and the frame borders ends.

At this time, the command issuing function 159 finds the name of the region "Hand" based on text extracted through voice recognition from the voice input with reference to the command DB 161. The command issuing function 159 estimates a manipulation command for a region (region of Layer 4-1) specified as a manipulation target with reference to the command DB 161. For example, when "zoom in" and "selection" are defined as manipulation commands executable for general regions in the command DB 161, the command issuing function 159 can recognize that selection of the region of Layer 4-1 is meaningless due to the fact that Layer 4 is the lowest layer and there are no more subordinate layer regions and can estimate that the manipulation command is "zoom in" based on this recognition. Thus, the command issuing function 159 issues a command to give a request for expanding and displaying an image using the region of Layer 4-1 as a criterion to the image generation function 151. In response to this command, the image generation function 151 displays an image expanded using the region of Layer 4-1 as the criterion on the display 110, as illustrated in FIG. 9B.

Here, in the step shown in FIG. 9B, the display control function 155 displays no address term of a new region on the display 110 since Layer 4 is the lowest layer, as described above. On the other hand, as in the image displayed up to FIG. 9A, a zoom out manipulation can be performed even in the image displayed in FIG. 9B. Therefore, the display control function 155 temporarily displays an address term C2 corresponding to the zoom out manipulation on the display 110. For example, according to a relation with a subject region of an image being displayed, the display position (the top right corner of the image) of the address term C2 may be set to a position different from the display position (the bottom left corner of the image) of the address term C1 up to FIG. 9A.

Thereafter, when the display of the image (the image expanded using the region of Layer 4-3 as the criterion) starts and a predetermined time passes, the display control function 155 ends the display of the address term AT4-1 and the corresponding frame border and the display returns to the display of the sample image (the image expanded using the region of Layer 4-1 as the criterion). The user can perform a manipulation on the regions corresponding to the address terms during or after the display of the address terms by giving a voice input including the address terms to the display device 100. In the illustrated example, as illustrated in FIG. 9B, the user gives a voice input "Show 'Girl's Face'" to the display device 100 before the display of the address terms and the frame borders ends.

At this time, the command issuing function 159 extracts the name of the manipulation command, "Show," and the address term of the region, "Girl's Face," based on text extracted through voice recognition from the voice input with reference to the command DB 161. However, in the image display at the time of FIG. 9B, there is no region of the address term, "Girl's Face." Thus, the command issuing function 159 retrieves information regarding the address term stored in the command DB 161 in association with the layered structure of the regions. For example, the command issuing function 159 analyzes the text "Girl's Face," and first retrieves "Girl" and subsequently retrieves "Face." This is because there is a probability of an address term for a more subordinate layer region, for example, "Face," being redundantly defined in other subordinate layer regions included in mutually different superordinate layer regions.

In the illustrated example, as described above, the command issuing function 159 first finds the address term "Girl" defined for the region of Layer 3-4 as the result obtained by retrieving the address term "Girl" from the command DB 161. Then, the command issuing function 159 finds the address term "Face" defined for the region of Layer 4-4 as the result obtained by retrieving the address term "Face" in subordinate layer regions included in the region of Layer 3-4 from the command DB 161. Based on the above retrieval results, the command issuing function 159 issues a command to give a request for expanding and displaying the image using the region of Layer 4-4 as a criterion to the image generation function 151. In response to this command, the image generation function 1S1 expands and displays the image expanded using the region of Layer 4-4 as the criterion, as illustrated in FIG. 9C. Throughout the foregoing steps of FIGS. 8A to 9B, a manipulation intended by the user can be realized even for the voice input including the address term which is not displayed at that time on the display 110 but which the user remembers as being previously displayed, since the address terms of the regions previously defined and displayed are stored in the command DB 161.

2-3. Modification Examples

First Modification Example

FIGS. 10A to 10C are diagrams illustrating a first modification example of the second embodiment of the present disclosure. In FIGS. 10A to 10C, when the speech "Zoom in 'Boy'" of the user described above with reference to FIGS. 8B and 8C is acquired as a voice input, a change in display of the display 110 at the time of the expansion of display of an image using the region of Layer 3-3 as a criterion is shown together with display during transition (FIG. 10B).

In FIG. 10B, text T including an address term included in the voice input and recognized by the display device 100 (the command issuing function 159) during the step of transition of the image displayed on the display 110) from the image of the region of Layer 1 to the image expanded and displayed using the region of Layer 3-3 as the criterion is displayed by the image generation function 151. Alternatively, the text T may be text indicating a command issued by the command issuing function 159 of the display device 100. When such a display is made on the display 110, the user can recognize that the display device 100 operates according to an intention of the user. For example, when the display device 100 does not correctly recognize a user's voice input and a command unintended by the user is performed, the user can understand what has happened based on such a display.

Second Modification Example

FIGS. 11 and 12 are diagrams illustrating a second modification example of the second embodiment of the present disclosure. In the embodiment, as described with reference to FIG. 7, the layered structure of the regions including the subject regions has been set for a photo displayed on the display 110. In the example illustrated in FIG. 7, all of the subordinate layer regions are included in the superordinate layer region, but are not included in this modification example.

For example, as illustrated in FIG. 11, only a part of a subordinate layer region may be included in a superordinate layer region in some cases. In the example illustrated in FIG. 11, only a part of the region of Layer 4-1 is included in the region of Layer 3-3 which is a superordinate layer region and the other part thereof is outside of the region of Layer 3-3. Likewise, only a part of the region of Layer 4-3 is included in the region of Layer 3-4 which is a superordinate layer region and the other part thereof is outside of the region of Layer 3-4. Like another region of Layer 3 or Layer 4, a subordinate layer region which is entirely included in a superordinate layer region can be present.

FIG. 12 illustrates an example of the expansion and display of an image when a region is set as in the example of FIG. 11. In the modification example, since the entire subordinate layer region is not necessarily included in the superordinate layer region, a relation recognized between the superordinate layer region and the subordinate layer region can be relatively slight. Accordingly, for example, even when an image is expanded and displayed using the region of Layer 3-3 as a criterion, not only address terms (AT4-1 and AT4-2) of the subordinate layer regions (Layer 4-1 and Layer 4-2) included in Layer 3-3 but also an address term (AT4-3) of the subordinate layer region (Layer 4-3) included in Layer 3-4 can be displayed.

Here, since both of the address terms AT4-1 and AT4-3 originally overlap as "Hand," the address term definition function 153 adds sequence numbers to distinguish the address terms from each other, so that the address term AT4-1 becomes "Hand1" and the address term AT4-3 becomes "Hand2." When only one of the address terms AT4-1 and AT4-3 is displayed on the display 110, the address term definition function 153 may omit a load of the sequence numbers.

The above-described display is possible irrespective of whether only a part of a subordinate layer region is included in a superordinate layer region or the entire subordinate layer region is included in a superordinate layer region. That is, regions in an image can be configured as in the example illustrated in FIG. 7 and can also be configured as in the example illustrated in FIG. 11. For example, when an image is expanded and displayed using the region of Layer 3-3 which is a subordinate layer region of the region of Layer 2-2 as the criterion, the address terms of Layers 4-1 and Layer 4-2 which are subordinate layer regions of the region of Layer 3-3 are temporarily displayed. In addition, the region of Layer 3-4 included in a display range of the image and the address terms of Layer 4-3 and Layer 4-4 which are subordinate layer regions of the region of Layer 3-4 can also be temporarily displayed. However, when the address term of the region of Layer 4-1 or Layer 4-2 and the address term of the region of Layer 4-3 or Layer 4-4 overlap, the address terms are distinguished from each other by adding sequence numbers, as described above, or the overlapping can be resolved by not displaying the overlapping address term of the region of Layer 4-3 or Layer 4-4.

3. Third Embodiment

Next, a third embodiment of the present disclosure will be described. Since a configuration in the third embodiment is almost the same as that in the foregoing first embodiment except for display examples of address terms to be described below, detailed description other than that of the display examples of the address terms will be omitted.

FIG. 13 is a diagram illustrating a display example of address terms in the third embodiment of the present disclosure. In the embodiment, for example, as illustrated in the example of FIG. 13, an address term is defined for each of the display regions of a plurality of sub-images included in an image displayed on the display 110. In the illustrated example, the region of Layer 1 is defined in the entire image displayed on the display 110 and regions of Layer 2 are defined for display regions of the sub-images included in the image. The image displayed on the display 110 is an image displayed in a presentation by a presenter and includes a currently displayed slide (page) and sub-images indicating previously displayed graphs, pages, or the like. The address term definition function 153 can define address terms to correspond to display regions of main text (Layer 2-1) and a right graph (Layer 2-2) in a title "Current Slide," and a last graph (Layer 2-3), a last page (Layer 2-4), and a next page (Layer 2-5) displayed separately from "Current Slide."

At this time, the display control function 155 displays the image (the region of Layer 1) on the display 110 and temporarily displays an address term defined for a region corresponding to each sub-image and a frame border indicating a region corresponding to the address term on the display 110. In the drawing, an address term AT2-1 corresponding to the region of Layer 2-1 (the main text), an address term AT2-2 corresponding to the region of Layer 2-2 (the right graph), an address term AT2-3 corresponding to the region of Layer 2-3 (the last graph), an address term AT2-4 corresponding to the region of Layer 2-4 (the last page), and an address term AT2-5 corresponding to the region of Layer 2-5 (the next page) are temporarily displayed on the display 110 by the display control function 155.

In the embodiment, a voice input of the user given to the display device 100 can be, for example, "Show 'Last graph'" or "G to 'Next page.'" In response to the voice input, the command issuing function 159 issues a command to give a request for enlarging and displaying the graph referred to previously again, a command to give a request for proceeding to a next slide (page), or the like to the image generation function 151. For example, when the image generation function 151 newly displays a slide (page) displayed as "Next page" in the drawing in the region of "Current Slide" based on the command to give a request for proceeding to the next slide (page), the slide (page) displayed as "Current Slide" up to that time is a displayed as "Last page" at this time.

In the embodiment, the address term definition function 153 may define address terms based on a chronological change in display forms of the regions. For example, when the slide (page) displayed as "Current Slide" at that time is displayed to be smaller at a location separate from "Current slide," the address term definition function 153 may define an address term with the same meaning as that of "Last page" for the region corresponding to this slide (page).

4. Supplement

Embodiments of the present disclosure can include, for example, the information processing device described above (described as the display device), a system, an information processing method executed in the information processing device or the system, a program causing the information processing device to function, and a non-transitory computer-readable storage medium having a program stored therein.

The preferred embodiments of the present disclosure have been described above in detail with reference to the appended drawings, but embodiments of the present disclosure are not limited to the technical scope of the present disclosure. It should be apparent to those skilled in the art that various modifications or corrections may occur within the technical scope described in the claims and are, of course, understood to pertain to the technical scope of the present disclosure.

Additionally, the present technology may also be configured as below.

(1) An information processing device including:
   a processor configured to realize
      an address term definition function of defining an address term for at least a partial region of an image to be displayed on a display,
      a display control function of displaying the image on the display and temporarily displaying the address term on the display in association with the region,
      a voice input acquisition function of acquiring a voice input for the image, and
      a command issuing function of issuing a command relevant to the region when the address term is included in the voice input.

(2) The information processing device according to (1),
   wherein the region includes a superordinate layer region and a subordinate layer region, and
   wherein, when the superordinate layer region is displayed on the display, the display control function displays an address term of the subordinate layer region at least a part of which is included in the displayed superordinate layer region.

(3) The information processing device according to (2), wherein the command issuing function issues a command to expand and display the subordinate layer region.

(4) The information processing device according to (3),
   wherein the region includes a more subordinate layer region of the subordinate layer region, and
   wherein, when the subordinate layer region is expanded and displayed, the display control function displays an address term of the more subordinate layer region of the subordinate layer region at least a part of which is included in the subordinate layer region.

(5) The information processing device according to any one of (2) to (4), wherein the command issuing function issues a command to allow the subordinate layer region to enter a selection state.

(6) The information processing device according to (5),
   wherein the region includes a more subordinate layer region of the subordinate layer region, and
   wherein, when the subordinate layer region enters the selection state, the display control function displays an address term of the more subordinate layer region of the subordinate layer region at least a part of which is included in the subordinate layer region.

(7) The information processing device according to (6), wherein the command issuing function issues a command to expand and display the more subordinate layer region of the subordinate layer region.

(8) The information processing device according to any one of (2) to (7),
   wherein the superordinate layer region corresponds to an entire region of the image, and
   wherein the subordinate layer region corresponds to a display region of each of a plurality of sub-images included in the image.

(9) The information processing device according to (8), wherein the command issuing function issues a command to expand and display, in the entire region of the image, the sub-image corresponding to an address term included in the voice input among the plurality of sub-images.

(10) The information processing device according to any one of (2) to (7),
   wherein the superordinate layer region corresponds to an application image displayed in an entire region of the image, and
   wherein the subordinate layer region corresponds to a region of a GUI component included in the application image.

(11) The information processing device according to (2),
   wherein the superordinate layer region corresponds to an entire region of the image, and
   wherein the subordinate layer region corresponds to each of a plurality of subject regions recognized in the image.

(12) The information processing device according to (11), wherein the command issuing function issues a command to expand and display the image using, as a criterion, the subject region corresponding to an address term included in the voice input among the plurality of subject regions.

(13) The information processing device according to any one of (2) to (12), wherein the subordinate layer region is entirely included in the superordinate layer region.

(14) The information processing device according to any one of (1) to (13), wherein the address term definition function defines the address term based on set information regarding the region.

(15) The information processing device according to any one of (1) to (14), wherein the address term definition function defines the address term based on a location of the region in the image.

(16) The information processing device according to any one of (1) to (15), wherein the address term definition function defines the address term based on a chronological change in a display form of the region.

(17) The information processing device according to any one of (1) to (16), wherein the display control function displays, on the display, an address term included in the voice input.

(18) The information processing device according to any one of (1) to (17), wherein the display control function displays the issued command on the display.

(19) An information processing method including, by a processor
   defining an address term for at least a partial region of an image to be displayed on a display;
   displaying the image on the display and temporarily displaying the address term on the display in association with the region;
   acquiring a voice input for the image; and
   issuing a command relevant to the region when the address term is included in the voice input.

(20) A program causing a computer to realize:
   an address term definition function of defining an address term for at least a partial region of an image to be displayed on a display;
   a display control function of displaying the image on the display and temporarily displaying the address term on the display in association with the region;
   a voice input acquisition function of acquiring a voice input for the image; and
   a command issuing function of issuing a command relevant to the region when the address term is included in the voice input.

What is claimed is:

1. A voice input device comprising:
a processor configured to realize:
an image generation function for generating an image to be displayed on a display,
an address term definition function of defining an address term for at least a partial region of the image to be displayed on the display,
a display control function of displaying the image on the display and temporarily displaying the address term on the display in association with the partial region of the image, the partial region of the image having a first size,
a voice input acquisition function of acquiring a voice input for the image, and
a command issuing function of issuing a command relevant to the partial region of the image when the address term is included in the voice input, wherein the image generation function changes the size of the partial region of the image from the first size to a second size according to the command, the first size being different from the second size,
wherein the display control function displays the partial region of the image at the second size,
wherein the partial region of the image includes a superordinate layer region and a subordinate layer region,
wherein, when the superordinate layer region is displayed on the display, the display control function displays an address term of the subordinate layer region, at least a part of the subordinate layer region being included in the displayed superordinate layer region,
wherein the superordinate layer region corresponds to an entirety of the partial region of the image,
wherein the subordinate layer region corresponds to a display region of each of a plurality of sub-images included in the partial region of the image, and
wherein the command issuing function issues a command to expand and display, in the entirety of the partial region of the image, the sub-image corresponding to an address term included in the voice input among the plurality of sub-images.

2. The voice input device according to claim 1, wherein the command issuing function issues a command to expand and display the subordinate layer region.

3. The voice input device according claim 2, wherein the partial region of the image includes a more subordinate layer region of the subordinate layer region, and wherein, when the subordinate layer region is expanded and displayed, the display control function displays an address term of the more subordinate layer region of the subordinate layer region at least a part of which is included in the subordinate layer region.

4. The voice input device according to claim 1, wherein the command issuing function issues a command to allow the subordinate layer region to enter a selection state.

5. The voice input device according to claim 4, wherein the partial region of the image includes a more subordinate layer region of the subordinate layer region, and wherein, when the subordinate layer region enters the selection state, the display control function displays an address term of the more subordinate layer region of the subordinate layer region at least a part of which is included in the subordinate layer region.

6. The voice input device according to claim 5, wherein the command issuing function issues a command to expand and display the more subordinate layer region of the subordinate layer region.

7. The voice input device according to claim 1, wherein the superordinate layer region corresponds to an application image displayed in an entirety of the partial region of the image, and wherein the subordinate layer region corresponds to a region of a GUI component included in the application image.

8. The voice input device according to claim 1, wherein the superordinate layer region corresponds to an entirety of the partial region of the image, and wherein the subordinate layer region corresponds to each of a plurality of subject regions recognized in the partial region of the image.

9. The voice input device according to claim 8, wherein the command issuing function issues a command to expand and display the partial region of the image using, as a criterion, the subject region corresponding to an address term included in the voice input among the plurality of subject regions.

10. The voice input device according to claim 1, wherein the subordinate layer region is entirely included in the superordinate layer region.

11. The voice input device according to claim 1, wherein the address term definition function defines the address term based on set information regarding the region.

12. The voice input device according to claim 1, wherein the address term definition function defines the address term based on a location of the partial region in the image.

13. The voice input device according to claim 1, wherein the address term definition function defines the address term based on a chronological change in a display form of the partial region of the image.

14. The voice input device according to claim 1, wherein the display control function displays, on the display, an address term included in the voice input.

15. The voice input device according to claim 1, wherein the display control function displays the issued command on the display.

16. A voice input method comprising, by a processor:
generating an image to be displayed on a display;
defining an address term for at least a partial region of the image to be displayed on the display;
displaying the image on the display and temporarily displaying the address term on the display in association with the partial region of the image, the partial region of the image having a first size;
acquiring a voice input for the image; issuing a command relevant to the partial region of the image when the address term is included in the voice input;
changing the size of the partial region of the image displayed on the display from the first size to a second size according to the command, the first size being different from the second size;
displaying the partial region of the image at the second size, the partial region of the image includes a superordinate layer region and a subordinate layer region;
displaying, when the superordinate layer region is displayed on the display, an address term of the subordinate layer region, at least a part of the subordinate layer region being included in the displayed superordinate layer region and the superordinate layer region corresponding to an entirety of the partial region of the image; and
expanding and displaying, in the entirety of the partial region of the image, the sub-image corresponding to an address term included in the voice input among the plurality of sub-images, wherein the subordinate layer region corresponds to a display region of each of a plurality of sub-images included in the partial region of the image.

17. A computer comprising circuitry and a storage for storing a program causing the circuitry of the computer to realize:
   an image generation function for generating an image to be displayed on a display;
   an address term definition function of defining an address term for at least a partial region of the image to be displayed on the display;
   a display control function of displaying the image on the display and temporarily displaying the address term on the display in association with the partial region of the image, the partial region of the image having a first size;
   a voice input acquisition function of acquiring a voice input for the image; and
   a command issuing function of issuing a command relevant to the partial region of the image when the address term is included in the voice input,
   wherein the image generation function changes the size of the partial region of the image from the first size to a second size according to the command, the first size being different from the second size,
   wherein the display control function displays the partial region of the image at the second size,
   wherein the partial region of the image includes a superordinate layer region and a subordinate layer region,
   wherein, when the superordinate layer region is displayed on the display, the display control function displays an address term of the subordinate layer region, at least a part of the subordinate layer region being included in the displayed superordinate layer region,
   wherein the superordinate layer region corresponds to an entirety of the partial region of the image,
   wherein the subordinate layer region corresponds to a display region of each of a plurality of sub-images included in the partial region of the image, and
   wherein the command issuing function issues a command to expand and display, in the entirety of the partial region of the image, the sub-image corresponding to an address term included in the voice input among the plurality of sub-images.

\* \* \* \* \*